(12) United States Patent
Sato et al.

(10) Patent No.: US 6,691,508 B2
(45) Date of Patent: Feb. 17, 2004

(54) AIR-FUEL RATIO CONTROL SYSTEM FOR INTERNAL COMBUSTION ENGINE

(75) Inventors: Kenichi Sato, Yokohama (JP); Kengo Kubo, Yokohama (JP); Kimiyoshi Nishizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/163,427

(22) Filed: Jun. 7, 2002

(65) Prior Publication Data

US 2002/0194838 A1 Dec. 26, 2002

(30) Foreign Application Priority Data

Jun. 21, 2001 (JP) .................................... 2001-188037

(51) Int. Cl.7 ................................................. F01N 3/00
(52) U.S. Cl. .............................. 60/285; 60/276; 60/301
(58) Field of Search ........................ 60/274, 276, 285, 60/298, 301; 123/672; 701/101, 103, 109

(56) References Cited

U.S. PATENT DOCUMENTS 5,743,084 A * 4/1998 Hepburn .................. 144/134.1
6,101,809 A * 8/2000 Ishizuka et al. ............... 60/276
6,308,515 B1 * 10/2001 Bidner et al. .................. 60/274
6,477,833 B2 * 11/2002 Tayama et al. ................ 60/274
6,490,855 B1 * 12/2002 Bidner et al. .................. 60/274
6,502,388 B2 * 1/2003 Takaku et al. ................. 60/285

FOREIGN PATENT DOCUMENTS

| JP | 8-232646 | 9/1996 |
| JP | 11-062657 A | 3/1999 |
| JP | 11-062666 A | 3/1999 |
| JP | 11-210524 | 8/1999 |

* cited by examiner

Primary Examiner—Thomas Denion
Assistant Examiner—Diem Tran
(74) Attorney, Agent, or Firm—Foley & Lardner

(57) ABSTRACT

An air-fuel ratio control system for an internal combustion engine provided with a NOx trap catalyst which is disposed in an exhaust gas passageway and arranged to trap NOx when the air-fuel ratio of exhaust gas flowing to the NOx trap catalyst is lean and to release and reduce trapped NOx when the air-fuel ratio is rich. The air-fuel ratio control system comprises a sensor for detecting an air-fuel ratio of exhaust gas in the exhaust gas passageway downstream of the NOx trap catalyst. Additionally, a control circuit is provided and configured to cause the engine to operate at a rich air-fuel ratio to accomplish a rich air-fuel ratio engine operation after an engine operation at a lean air-fuel ratio, and continue the rich air-fuel ratio engine operation for a duration even after the sensor has detected that the air-fuel ratio of exhaust gas is rich.

17 Claims, 11 Drawing Sheets

FIG.2A  AIR-FUEL RATIO AT INLET OF CATALYST
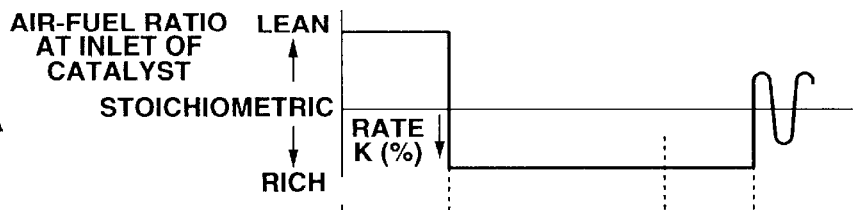
FIG.2B  OXYGEN RELEASING RATE
FIG.2C  AMOUNT OF O2 STORED
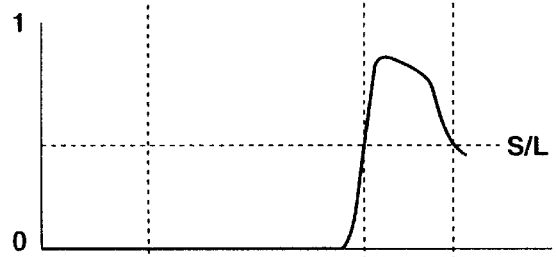
FIG.2D  OUTPUT (V) OF OXYGEN SENSOR AT OUTLET OF CATALYST
FIG.2E  NOx EMISSION AMOUNT
FIG.2F  TIMER
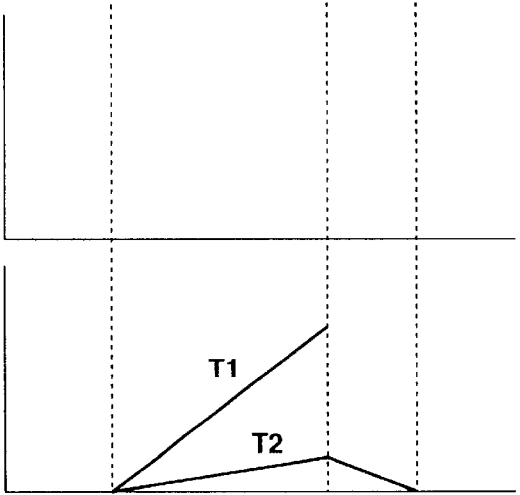

$T2 \times K = T3 \times K / 2$
$\therefore T3 = T2 \times 2$ $K1 = K - K / T3 \times T4$

FIG.9
MAP TABLE 1
| F2 | L |
|---|---|
| F2 ≥ F2 INITIAL VALUE × a | L1 |
| F2 INITIAL VALUE × a > F2 ≧ F2 INITIAL VALUE × b | L2 |
| F2 INITIAL VALUE × b > F2 | L3 |
FIG.10
INCREASING RATE OF FUEL INJECTION AMOUNT
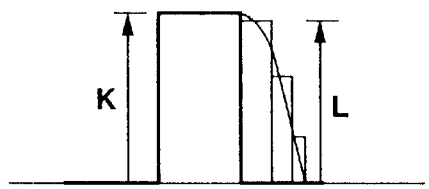
FIG.11
AIR-FUEL RATIO FEEDBACK COEFFICIENT
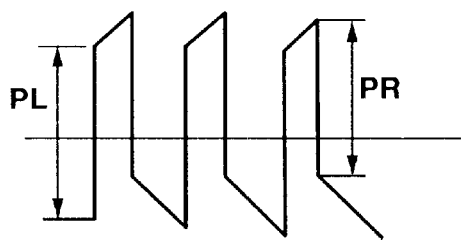

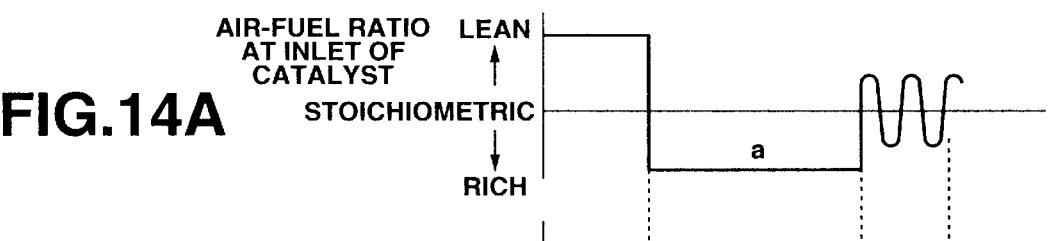
FIG.14A  AIR-FUEL RATIO AT INLET OF CATALYST
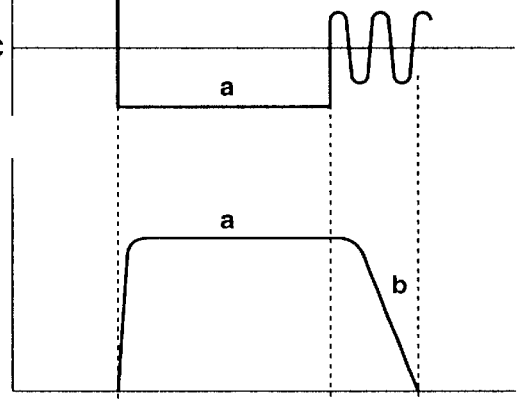
FIG.14B  OXYGEN RELEASING RATE
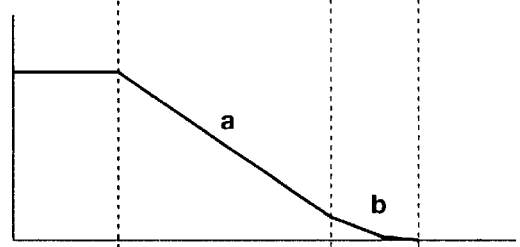
FIG.14C  AMOUNT OF O₂ STORED
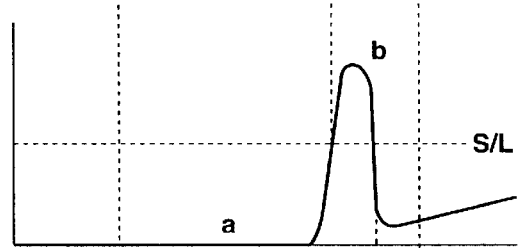
FIG.14D  OUTPUT (V) OF OXYGEN SENSOR AT OUTLET OF CATALYST
FIG.14E  NOx EMISSION AMOUNT

AIR-FUEL RATIO CONTROL SYSTEM FOR INTERNAL COMBUSTION ENGINE

BACKGROUND OF THE INVENTION

This invention relates to improvements in an air-fuel ratio control system for an internal combustion engine, and more particularly to a technique for controlling the air-fuel ratio for the purpose of improving a NOx emission control performance.

Hitherto, it has been known that an automotive internal combustion engine is equipped with a NOx trap catalyst which is arranged to trap NOx when the air-fuel ratio of exhaust gas flowing to the NOx trap catalyst is lean and to release and reduce the trapped NOx when the air-fuel ratio of exhaust gas is rich. Accordingly, after the engine is operated at a lean air-fuel ratio, the engine is operated at a rich air-fuel ratio thereby reducing NOx. In case of enriching the air-fuel ratio in order to reduce NOx, insufficient reduction of NOx can be made if a time for enriching the air-fuel ratio is insufficient, thereby increasing the emission level of NOx. In contrast, if the time for enriching the air-fuel ratio is too long so that excessive fuel is injected from a fuel injector, an emission level of CO and HC (hydrocarbons) increases.

In view of the above, it is required in exhaust gas emission control to accomplish an optimum enrichment for the air-fuel ratio for the purpose of preventing an increase in emission level of CO and HC while sufficiently reducing NOx. In order to meet such purpose, some proposals have been made as disclosed in Japanese Patent Provisional Publication Nos. 8-232646 and 11-210524. According to such proposals, the enrichment of the air-fuel ratio is terminated at a timing when the air-fuel ratio detected by an air-fuel ratio sensor disposed downstream of the NOx trap catalyst shifts to the stoichiometric value or to a value richer than the stoichiometric value, thereby intending accomplishing the optimum enrichment.

It will be understood that the NOx trap catalyst and other catalysts in the exhaust gas passageway of the engine store therein oxygen contained in exhaust gas. Consequently, in case that NOx is trapped in the NOx trap catalyst when the air-fuel ratio of exhaust gas is lean, a major part of CO and HC in enriched exhaust gas for NOx reducing purpose is used to consume oxygen stored in the catalysts.

BRIEF SUMMARY OF THE INVENTION

In order to accomplish such an optimum enrichment of the air-fuel ratio as to sufficiently reduce NOx and not to increase the emission level of CO and HC, it is required to make the enrichment of the air-fuel ratio corresponding to the amount of oxygen stored in the catalysts in the exhaust gas passageway.

Oxygen stored in the catalyst disposed in the exhaust gas passageway when the air-fuel ratio is lean will be released from the catalysts when the air-fuel ratio is rich to react with CO and HC in exhaust gas. However, the rate of releasing oxygen is not constant and lowers as the amount of oxygen remaining in the catalyst decreases, in which it is assumed that the oxygen concentration in exhaust gas at the position of the outlet of the catalyst is lowered. In this regard, experiments of the present inventors have revealed that, in practice, oxygen remains in the catalysts even when the air-fuel ratio sensor disposed downstream of the catalyst has judged that the air-fuel ratio becomes rich after the air-fuel ratio of exhaust gas flowing to the catalyst is enriched or become rich. Accordingly, if the enrichment of the air-fuel ratio of exhaust gas flowing to the catalyst is terminated at the timing of the judgment by the air-fuel ratio sensor, the enrichment of the air-fuel ratio becomes insufficient.

In the conventional techniques disclosed in Japanese Patent Provisional Publication Nos. 8-232646 and 11-210524, the enrichment of the air-fuel ratio is terminated at the timing when the air-fuel ratio detected by the air-fuel ratio sensor disposed downstream of the catalyst has shifted to the stoichiometric level or to a level richer than the stoichiometric level. As a result, it is impossible to judge as to whether oxygen stored in the catalysts has been completely released or not. Thus, NOx cannot be effectively reduced in such a conventional manner as to terminate the enrichment of the air-fuel ratio at the timing when the air-fuel ratio detected by the air-fuel ratio sensor disposed downstream of the catalyst has shirted to the stoichiometric level or the level richer than the stoichiometric level.

Particularly in case that shifting is made to a feedback control for the stoichiometric air-fuel ratio under the action of the air-fuel ratio sensor disposed upstream of the catalyst after a rich air-fuel ratio engine operation is made, the catalyst is lowered in NOx reduction ability thereby increasing the emission level of NOx. Because, oxygen has still remained in the catalysts in the above conventional manner to terminate the enrichment of the air-fuel ratio at the timing when the air-fuel ratio detected by the air-fuel ratio sensor disposed downstream of the catalyst shifts to the stoichiometric level or the level richer than the stoichiometric level.

Additionally, efficiencies of releasing and reducing NOx upon reacting with CO and HC increase as the amount of oxygen stored in the catalyst decreases. Accordingly, in case that oxygen has remained in the catalysts, NOx tends to remain in the NOx trap catalyst as compared with another case in which oxygen has been completely released from the NOx trap catalyst. Therefore, even in case that returning is made to the lean air-fuel ratio engine operation immediately after the rich air-fuel ratio engine operation, the NOx trapping ability of the NOx trap catalyst is insufficient if NOx has remained in the NOx trap catalyst, thereby shortening a time in which the lean air-fuel ratio engine operation is made thus to lower fuel economy and exhaust gas purification performance.

It is, therefore, an object of the present invention to provide an improved air-fuel ratio control system for an internal combustion engine, which can effectively overcome drawbacks encountered in conventional air-fuel ratio control systems arranged in combination with a NOx trap catalyst.

Another object of the present invention is to provide an improved air-fuel ratio control system for an internal combustion engine, by which NOx can be sufficiently released from and reduced by a NOx trap catalyst under reducing materials in exhaust gas while totally lowering the emission levels of CO, HC and NOx with a good balance.

A further object of the present invention is to provide an improved air-fuel ratio control system for an internal combustion engine, by which oxygen remaining in a NOx trap catalyst and other catalysts disposed in an exhaust gas passageway of the engine can be sufficiently expelled prior to release and reduction of NOx in the NOx trap catalyst thereby optimizing reaction of NOx and the reducing materials (such as CO and HC).

An aspect of the present invention resides in an air-fuel ratio control system for an internal combustion engine provided with a NOx trap catalyst disposed in an exhaust gas passageway. The NOx trap catalyst is arranged to trap NOx in a first condition in which air-fuel ratio of exhaust gas flowing to the NOx trap catalyst is lean and to release and reduce trapped NOx in a second condition in which air-fuel ratio of exhaust gas flowing to the NOx trap catalyst is rich. The air-fuel ratio control system comprises a sensor for detecting an air-fuel ratio of exhaust gas in the exhaust gas passageway downstream of the NOx trap catalyst. Additionally, a control circuit is provided and configured to cause the engine to operate at a rich air-fuel ratio to accomplish a rich air-fuel ratio engine operation after an engine operation at a lean air-fuel ratio, and continue the rich air-fuel ratio engine operation for a duration even after the sensor has detected that the air-fuel ratio of exhaust gas is rich.

Another aspect of the present invention resides in an air-fuel ratio control system for an internal combustion engine provided with a NOx trap catalyst disposed in an exhaust gas passageway. The NOx trap catalyst is arranged to trap NOx in a first condition in which air-fuel ratio of exhaust gas flowing to the NOx trap catalyst is lean and to release and reduce trapped NOx in a second condition in which air-fuel ratio of exhaust gas flowing to the NOx trap catalyst is rich. The air-fuel ratio control system comprises first means for detecting an air-fuel ratio of exhaust gas in the exhaust gas passageway downstream of the NOx trap catalyst. Second means is provided to cause the engine to operate at a rich air-fuel ratio to accomplish a rich air-fuel ratio engine operation after an engine operation at a lean air-fuel ratio. Additionally, third means is provided to continue the rich air-fuel ratio engine operation for a duration even after the detecting means has detected that the air-fuel ratio of exhaust gas is rich.

A further aspect of the present invention resides in a method of controlling an air-fuel ratio in an internal combustion engine provided with a NOx trap catalyst disposed in an exhaust gas passageway. The NOx trap catalyst is arranged to trap NOx in a first condition in which air-fuel ratio of exhaust gas flowing to the NOx trap catalyst is lean and to release and reduce trapped NOx in a second condition in which air-fuel ratio of exhaust gas flowing to the NOx trap catalyst is rich. The method comprises (a) detecting an air-fuel ratio of exhaust gas in the exhaust gas passageway downstream of the NOx trap catalyst; (b) causing the engine to operate at a rich air-fuel ratio to accomplish a rich air-fuel ratio engine operation after an engine operation at a lean air-fuel ratio; and (c) continuing the rich air-fuel ratio engine operation for a duration even after the sensor has detected that the air-fuel ratio of exhaust gas is rich.

BRIEF DESCRIPTION OF THE DRAWINGS

FIGS. 2A to 2F are time charts showing state-changes at various parts in the exhaust gas purifying system of FIG. 1, under control of the air-fuel ratio control system;

FIG. 9 is a map table used in the control in FIG. 8;

FIG. 10 is a graphical representation showing setting of the increasing rate of the fuel injection amount in the fifth embodiment air-fuel ratio control system;

FIG. 11 is an explanatory view for an air-fuel ratio feedback coefficient used in the control in FIG. 8;

FIGS. 14A to 14E are time charts showing state-changes at various parts in an exhaust gas purifying system, obtained by experiments conducted by the present inventors.

DETAILED DESCRIPTION OF THE INVENTION

Figure 1:
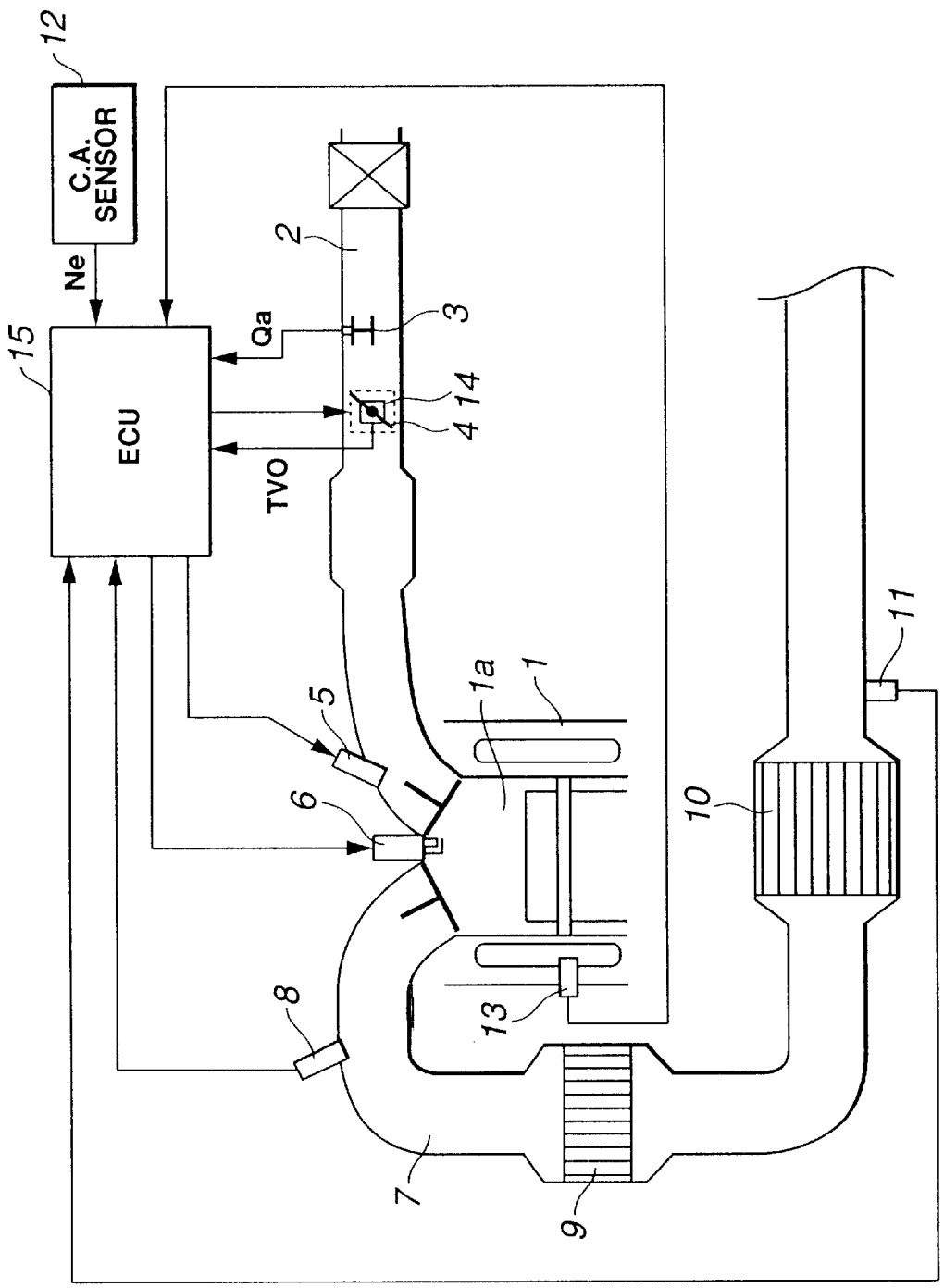
FIG. 1 is a schematic illustration of a first embodiment of an air-fuel ratio control system according to the present invention, incorporated with an internal combustion engine provided with an exhaust gas purifying system.

Referring now to FIG. 1 of the drawings, a first embodiment of an air-fuel ratio control system for an internal combustion engine, according to the present invention is illustrated in combination of internal combustion engine 1. Engine 1 is provided with intake air passageway 2 in which air flow meter 3 is disposed to detect an intake air flow amount Qa (or a flow amount of intake air in the intake passageway 2). Electronically controlled throttle valve 4 is disposed in intake air passageway 2 downstream of air flow meter 3 with respect to flow of intake air in intake air passageway 2. Engine 1 is formed with a plurality of combustion chambers 1a each of which is defined in an engine cylinder (not identified). Spark plug 6 is disposed in each combustion chamber. Fuel injector valve 5 is disposed in an intake port (not identified) forming part of intake air passageway 2 to inject fuel into the intake port. Fuel injector 5 may be disposed in each combustion chamber to directly inject fuel into the combustion chamber.

Engine 1 is provided with exhaust gas passageway 7 in which upstream-side air-fuel ratio sensor 8 is disposed to detect air-fuel ratio of exhaust gas in exhaust gas passageway 7 at a upstream-side or near an exhaust port (not identified) forming part of the exhaust gas passageway. Upstream-side catalyst 9 is disposed in the exhaust gas passageway 7 downstream of upstream-side air-fuel ratio sensor 8. NOx trap catalyst 10 is disposed in the exhaust gas passageway 7 downstream of upstream-side catalyst 9. Downstream-side air-fuel ratio sensor 11 is disposed in the exhaust gas passageway downstream of NOx trap catalyst 10 to detect an air-fuel ratio of exhaust gas in the exhaust gas passageway downstream of NOx trap catalyst 10. It will be understood that upstream-side catalyst 9 and NOx trap catalyst 10 constitute an exhaust gas purifying system for lowering the emission levels of noxious components in exhaust gas discharged from the engine.

NOx trap catalyst 10 is arranged to trap NOx in exhaust gas in an exhaust gas condition in which air-fuel (air/fuel) ratio of exhaust gas is lean or leaner (larger) than a stoichiometric level, and to release and reduce the trapped NOx by its three-way catalyst layer in an exhaust gas condition in which air-fuel ratio (air/fuel) of exhaust gas is rich or richer (larger) than the stoichiometric level. NOx trap catalyst 10 contains a noble metal (for example, platinum) and a NOx trap agent (for example, alkali metal such as barium). Additionally, NOx trap catalyst 10 contains an oxygen storage agent (for example, ceria)

Upstream-side catalyst 9 positioned upstream of NOx trap catalyst 10 is provided to improve an exhaust gas purifying efficiency at engine starting. While two catalysts 9, 10 have been shown and described as being provided respectively at the upstream-side and downstream-side in the exhaust gas passageway, it will be understood that the number and position of catalysts are not limited to particular those. Additionally, in discussion made hereinafter, mere "(the) catalyst" represents the combination of upstream-side catalyst 9 and NOx trap catalyst 10, and therefore "(the) inlet of (the) catalyst" represents a position (in exhaust gas passageway 7) upstream of upstream-side catalyst 9 while "(the) outlet of (the) catalyst" represents a position (in exhaust gas passageway 7) downstream of NOx trap catalyst 10.

Upstream-side air-fuel ratio sensor 8 is adapted to detect air-fuel ratio of exhaust gas in accordance with an oxygen concentration in exhaust gas. Upstream-side air-fuel ratio sensor 8 may be a stoichiometric air-fuel ratio sensor for detecting only a stoichiometric air-fuel ratio of exhaust gas, or may be a regional air-fuel ratio sensor which can detect a wide range of air-fuel ratio. Downstream-side air-fuel ratio sensor 11 is adapted similarly to upstream-side air-fuel ratio sensor 8 and therefore may be the stoichiometric air-fuel sensor or may be the regional air-fuel ratio sensor.

As sensors for detecting various engine operating conditions, crank angle sensor 12, engine coolant temperature sensor 13 and throttle position sensor 14 are provided in addition to air-flow meter 3 and air-fuel ratio sensors 8, 11. The crank angle sensor 12 is provided to detect an engine speed Ne and the like of the engine 1. The engine coolant temperature sensor 13 is provided to detect a temperature of engine coolant. Throttle position sensor 14 is provided to detect a position or opening degree TVO of throttle valve 4. These sensors 3, 8, 11, 12, 13, 14 output detection signals which are respectively representative of detected values of the intake air flow amount, the air-fuel ratio, the air-fuel ratio, the engine speed and the like, the engine coolant temperature and the throttle valve position. These detection signals from the sensors are input to engine control unit (ECU) 15.

Engine control unit 15 includes a microcomputer or control circuit and arranged to operate or drive electronically controlled throttle valve 4 to obtain a required amount of intake air to be supplied to the combustion chambers of the engine, to set a fuel injection amount (pulse width for fuel injection) Ti and a fuel injection timing in accordance with intake air amount Qa detected by air flow meter 3 and engine speed N detected by the crank angle sensor 12, and to produce a fuel injection signal in accordance with fuel injection amount Ti and the fuel injection timing and output the fuel injection signal to operate or drive fuel injector valve 5, and to set a spark timing and operate spark plug to produce spark at the set spark timing. Fuel injector valve 5 is constructed and arranged to inject fuel in the fuel injection amount, upon its operation made by the fuel injection signal.

In calculation or production of the fuel injection signal, a target air-fuel ratio is determined in accordance with an engine operating condition, followed by calculating the fuel injection amount in a manner to form an air-fuel mixture having the target air-fuel ratio in the combustion chambers of the engine, in which the target air-fuel ratio is basically set to be leaner or smaller than the stoichiometric level (air-fuel ratio). An air-fuel ratio feedback correction coefficient a is used to correct the above-mentioned fuel injection amount in such a manner as to cause the air-fuel ratio of exhaust gas detected by upstream-side air-fuel ratio sensor 8 to approach the target air-fuel ratio. The air-fuel ratio feedback correction coefficient is set, for example, under a proportional-plus-integral control.

After the engine has been once operated at a lean air-fuel ratio (leaner than the stoichiometric level) of air-fuel mixture or has once discharged exhaust gas having a lean air-fuel ratio (leaner than the stoichiometric level) detected upon fuel cut or the like, oxygen ($O_2$) and NOx are trapped in upstream-side catalyst 9 and NOx trap catalyst 10. Accordingly, merely by accomplishing a control for causing the air-fuel ratio of exhaust gas to approach the target air-fuel ratio, oxygen stored in the catalysts cannot be released, and therefore the air-fuel ratio of exhaust gas within the catalysts is lean so that trapped NOx cannot be sufficiently released and reduced. In view of this, the target air-fuel ratio (air/fuel) is temporarily controlled to be rich (or smaller than the stoichiometric level), thereby allowing stored oxygen to react with CO and HC in exhaust gas while sufficiently reducing NOx trapped in the catalysts.

Figure 13:
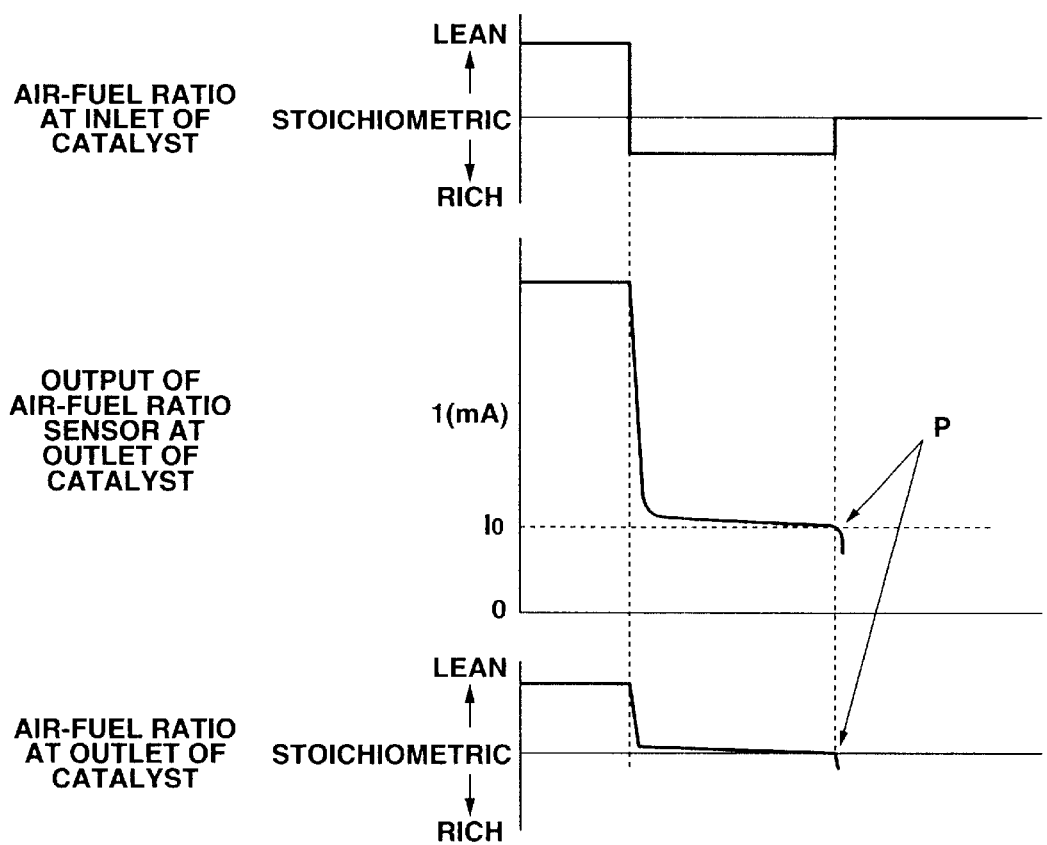
FIG. 13 is a graphical representation including time charts showing state-changes at various parts in an exhaust gas purifying system similar to that in FIG. 1, under control of a conventional air-fuel ratio control system.

Here, prior to explanation of a control according to the present invention, judgment of termination of so-called rich spike (intermittently enriching air-fuel ratio of air-fuel mixture to be supplied to the engine) disclosed in Japanese Patent Provisional Publication No. 8-232646 will be briefly discussed with reference to FIG. 13.

When air-fuel ratio of exhaust gas at the inlet of the catalyst shifts from a lean-side (leaner than the stoichiometric level) to a rich-side (richer than the stoichiometric level) to accomplish enrichment of the air-fuel ratio of exhaust gas, the air-fuel ratio at the outlet of the catalyst once takes a value around the stoichiometric level, while the output of an air-fuel ratio sensor at the outlet of the catalyst also once takes a value around the stoichiometric level. After continuation of the stoichiometric air-fuel ratio condition for a while, the air-fuel ratio at the outlet of catalyst begins to change into the rich-side while the output of the air-fuel ratio sensor at the outlet of catalyst is lowered to take a value smaller than that I0 corresponding to the stoichiometric level, at a timing P. This timing P is judged to stop the enrichment of the air-fuel ratio of exhaust gas at the inlet of the catalyst.

Behavior of oxygen stored in the catalyst after the enrichment of the air-fuel ratio of exhaust gas at the inlet of the catalyst will be discussed with reference to FIG. 14 which was obtained upon experiments conducted by the present inventors, in which an oxygen sensor for detecting only the stoichiometric air-fuel ratio was used as the air-fuel ratio sensor.

After the engine is operated at the lean air-fuel ratio of the air-fuel mixture detected at the inlet of the catalyst, the air-fuel ratio at the inlet of the catalyst is enriched to fall into the rich-side as indicated in FIG. 14A. In this case, when the output of the oxygen sensor at the outlet of the catalyst is lower than a slice level (indicated as "S/L" in FIG. 14B), i.e., for a period in which the air-fuel ratio at the outlet of the catalyst is judged to be lean as indicated by "a" in FIG. 14D, CO and HC in exhaust gas react with oxygen which is released from the catalyst at a constant oxygen releasing rate as indicated by "a" in FIG. 14B thus consuming oxygen stored in the catalyst as indicated in FIG. 14C. The oxygen releasing rate is a rate at which oxygen is released from the catalyst. However, even after the output of the oxygen sensor at the outlet of the catalyst exceeds the slice level (S/L), i.e., the air-fuel ratio at a position downstream of the catalyst is judged to be rich as indicated in FIG. 14D, oxygen stored in the catalyst cannot be completely released as indicated by "b" in FIG. 14C so that oxygen is gradually released lowering the oxygen releasing rate as indicated in FIG. 14B. Accordingly, even after the output of the oxygen sensor disposed at the outlet of the catalyst makes a judge that the air-fuel ratio becomes rich, oxygen exists in the catalyst and therefore it is insufficient to continue a condition of the rich air-fuel ratio of exhaust gas to be supplied to the catalyst.

In such a case, when a control of air-fuel ratio shifts to a feedback control under the action of the oxygen sensor disposed upstream of the catalyst, oxygen remaining in the catalyst is released so that the air-fuel ratio in the catalyst becomes leaner than the stoichiometric level thereby increasing the amount of NOx emitted through the catalyst as indicated in FIG. 14E.

Hereinafter, a control of the air-fuel ratio control system of this embodiment will be discussed in which an oxygen sensor is used as downstream-side air-fuel ratio sensor 11.

As shown in FIGS. 2A to 2F in which FIGS. 2A to 2E respectively correspond to FIGS. 14A to 14E, when engine 1 is operated at a lean air-fuel ratio (leaner or smaller than the stoichiometric level) of air-fuel mixture, the output of downstream-side air-fuel ratio sensor 11 (or oxygen sensor at the outlet of the catalyst) takes about 0 mV. Until the air-fuel ratio at the outlet of the catalyst becomes rich upon initiation of the enrichment, the air-fuel ratio at the outlet of the catalyst takes a value slightly leaner than the stoichiometric level, while the output of downstream-side air-fuel ratio sensor 11 takes about 0 mV. Assuming that an accumulated time obtained from a first time at which the air-fuel ratio at the inlet of the catalyst becomes rich to a second time at which the output of downstream-side air-fuel ratio sensor 11 is judged to be rich is T1 as indicated in FIG. 2F, a product value obtained by multiplying T1 by an enrichment rate K is generally regarded as an amount of reducing materials (CO and HC) which have passed the catalyst between the first and second times.

The amount of oxygen released even after the air-fuel ratio at the outlet of the catalyst is judged to be rich, i.e., the amount of oxygen remaining in the catalyst at the timing of making such a judgment as to be rich is regarded as an approximately constant rate relative to the above-mentioned product value (T1×K). This rate is assumed to be C1 (corresponding to the amount of oxygen remaining in the catalyst at the above timing), and T2 as indicated in FIG. 2F is calculated simultaneously with count-up of T1 as follows:

$$T2 \times K = T1 \times K \times C1 \therefore T2 = T1 \times C1 \quad (1)$$

Subsequently, the enrichment of the air-fuel ratio of the air-fuel mixture is continued even after the air-fuel ratio at the outlet of the catalyst is judged to be rich. Then, count-down of T2 is made. When T2 becomes 0, the enrichment is terminated.

Figure 3:
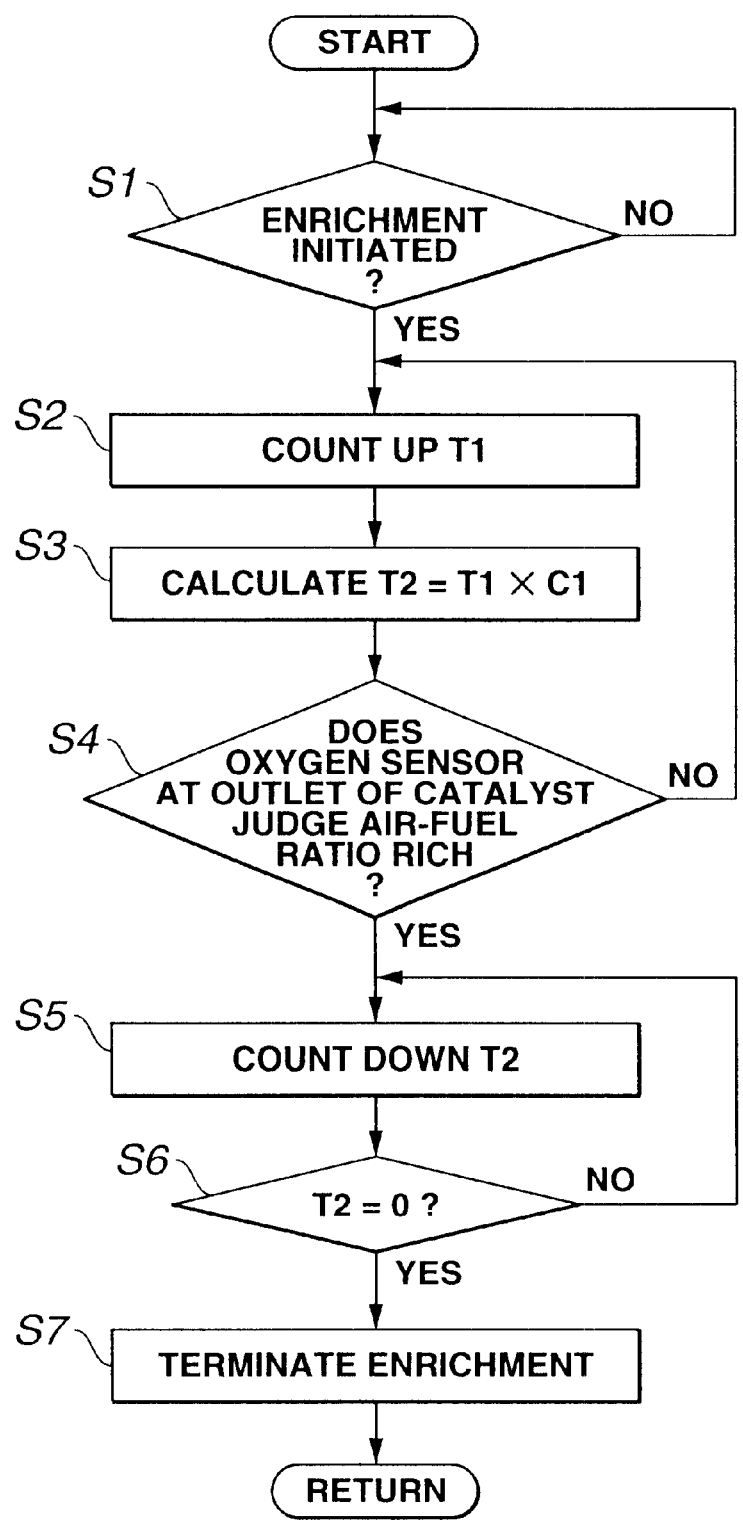
FIG. 3 is a flowchart of a control of the first embodiment air-fuel ratio control system.

Next, a control of the air-fuel ratio control system of the embodiment will be discussed with reference to a flowchart of FIG. 3. This control is the most basic and simplest.

At step S1, a judgment is made as to whether or not the air-fuel ratio at the inlet of the catalyst is inverted from the lean-side to the rich-side upon initiating engine operation at the rich air-fuel ratio by using upstream-side air-fuel ratio sensor 8. After making judgment of inversion of the air-fuel ratio, a flow goes to a step S2.

At step S2, count-up of the above-mentioned T1 is initiated.

At step S3, the above-mentioned value T2 (corresponding to the amount of oxygen remaining in the catalyst) is calculated according to the above-mentioned Eq. (1).

At step S4, judgment is made as to whether the air-fuel ratio at the outlet of the catalyst becomes rich or not. Until the result of the judgment becomes rich, the flow goes back to step S2 at which count-up of T1 is made, and then calculation of the remaining oxygen amount corresponding value T2 is continued. When the result of the judgment is such that the air-fuel ratio at the outlet of the catalyst becomes rich at step S4, the flow goes to step S5.

At step S5, at a time at which the air-fuel ratio at the outlet of the catalyst becomes rich, count-down is made on the remaining oxygen amount corresponding value T2 calculated as a value proportional to T1 which has been calculated at the same time.

At step S6, judgment is made as to whether the remaining oxygen amount corresponding value T2 counted down becomes 0 or not. Until the value T2 becomes 0, the flow goes back to step S5 to continue count-down of T2. When the result of the judgment is such that the remaining oxygen amount corresponding value T2 becomes 0 at step S6, judgment is made such that the enrichment of the air-fuel ratio after this time is unnecessary, and the enrichment of the air-fuel ratio is terminated at step S7.

Thus, at the time at which the air-fuel ratio at the outlet of the catalyst is judged to be rich, the enrichment of the air-fuel ratio is continued for a certain duration while estimating the amount of oxygen remaining in the catalyst, thereby making it possible to sufficiently and completely release oxygen in the catalyst. Then, after the enrichment of the air-fuel ratio is continued for the certain time, the engine operation shifts to that at the stochiometric air-fuel ratio. At this time, since oxygen in the catalyst has been sufficiently and completely released, NOx can be effectively reduced using CO, HC serving as the reducing materials while CO and HC can be decreased with a good balance. Additionally, even in case returning is made to the engine operation at the lean air-fuel ratio immediately after the engine operation for the enrichment of the air-fuel ratio, a good NOx trapping ability of the catalyst can be ensured since oxygen in the catalyst has been sufficiently and completely released, thereby making it possible to sufficiently ensure the engine operation at the lean air-fuel ratio thereby improving fuel economy and exhaust purification performance.

Figure 4A:
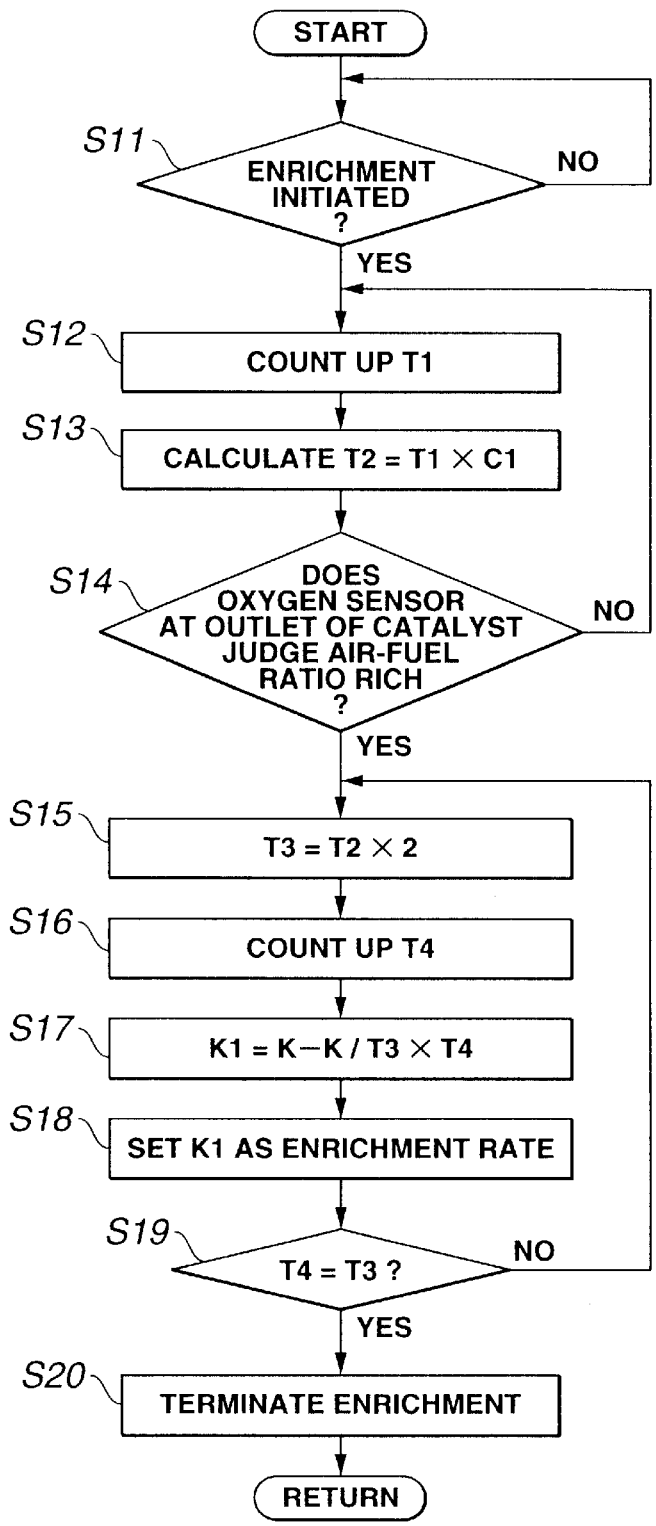
FIG. 4A is a flowchart of a control of a second embodiment of the air-fuel ratio control system according to the present invention.
Figure 4B:
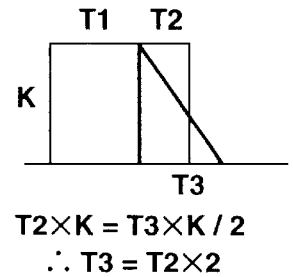
FIG. 4B is a graphical representation showing the control manner at a step of the control in FIG. 4A.
Figure 4C:
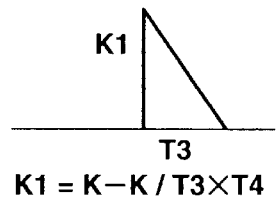
FIG. 4C is a graphical representation showing the control manner at another step of the control in FIG. 4A.

FIGS. 4A to 4C illustrate a control of a second embodiment of the air-fuel ratio control system according to the present invention, similar to the first embodiment air-fuel ratio control system. In summary, in this embodiment, the degree of the enrichment is gradually decreased with lapse of time for the duration in which the engine operation at the rich air-fuel ratio is continued.

The control of the air-fuel ratio control system of this embodiment is accomplished in accordance with a flowchart of FIG. 4A. In this flowchart, steps S11 to S14 are the same as those S1 to S4 in the flowchart of FIG. 4A. The control of this embodiment is different from that of the first embodiment in a point where the enrichment rate is gradually decreased at steps S15 to S18 after the air-fuel ratio at the outlet of the catalyst is judged to become rich at step S14.

First, at step S15, a duration T3 for which the engine operation at the rich air-fuel ratio is continued is set to be three times the duration T2 which has been calculated at step S13. The reason for setting the duration T3 is as follows: T2 is set corresponding to a case in which the enrichment rate is constant like in the first embodiment. However, in the second embodiment, the enrichment rate is gradually decreased at a certain rate so as to form a triangular shape as shown in FIG. 4B, thereby requiring two times the duration T2 in order to obtain the same accumulated value of the fuel injection amount for the enrichment as that in the first embodiment. While the control of this embodiment has been shown and described as being arranged such that T3 is calculated by multiplying T2 calculated at step S13 by two at step S15 for the purpose of simplicity of illustration, it will be understood that, in practice, T1 may be multiplied by a value of two times the rate C1 at step S13, thereby omitting step S15.

Subsequently, at step S16, a duration T4 for which the engine operation at the rich air-fuel ratio is continued is counted up. Then, the flow goes to a step S17.

At step S17, the enrichment rate K1 at every time or computer computation cycle is calculated according to the following equation:

$$K1 = K - K/T3 \times T4 \quad (2)$$

At step S18, K1 is set as the enrichment rate as shown in FIG. 4C.

At step S19, judgment is made as to whether the rich air-fuel ratio engine operation duration T4 reaches the above set duration T3 or not. When reaching, the enrichment of the air-fuel ratio is judged to be unnecessary. Accordingly, the flow goes to step S20 at which the enrichment is terminated.

With the above control of this embodiment, the enrichment rate is gradually decreased corresponding to the oxygen releasing rate which gradually decreases after the air-fuel ratio (detected by downstream-side air-fuel ratio sensor 11) at the outlet of the catalyst has become rich, thereby suppressing excess and deficiency in degree of the enrichment while improving exhaust gas purification performance during this enrichment.

Figure 5:
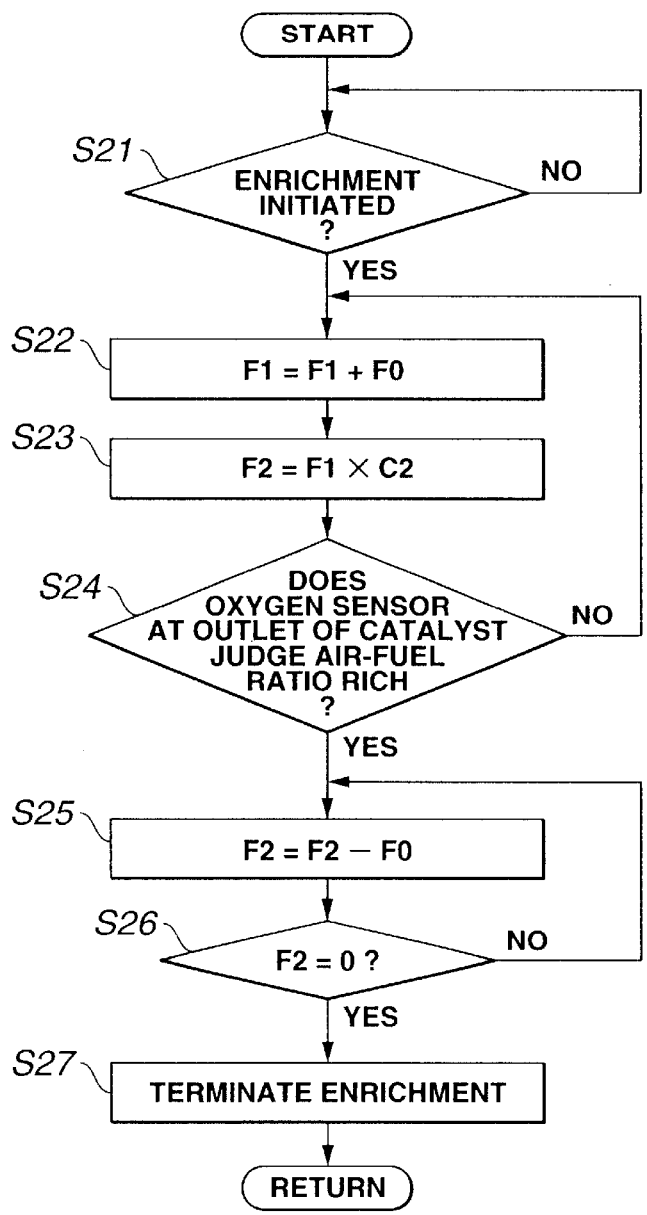
FIG. 5 is a flowchart of a control of a third embodiment of the air-fuel ration control system according to the present invention.

Next, FIG. 5 illustrates a control of a third embodiment of the air-fuel ratio control system according to the present invention, similar to the first embodiment air-fuel ratio control system. In summary, this embodiment is intended to accurately determine the amount of oxygen released after downstream-side air-fuel ratio sensor 11 (the oxygen sensor at the outlet of the catalyst) makes such a judgment that the air-fuel ratio is rich, upon making accurate calculation of the amount of the reducing materials (in exhaust gas) supplied for oxygen stored in the catalyst.

At step S21, a judgment is made as to whether or not the air-fuel ratio at the inlet of the catalyst is inverted from the lean-side to the rich-side upon initiating engine operation at the rich air-fuel ratio by using upstream-side air-fuel ratio sensor 8. After making judgment of inversion of the air-fuel ratio, the flow goes to step S22.

At step S22, a calculation is made according to the following equation:

$$F1 = F1 + F0 \quad (3)$$

where F1 is an accumulated value of a value F0 which corresponds to the fuel injection amount for the rich-side relative to the stoichiometric value and is calculated by the following equation:

$$F0 = Tp \times K/100 \times Ne/60/100 (ms/10\ ms) \quad (4)$$

where Tp is the pulse width (corresponding to the basic fuel injection amount) representing an opening time of fuel injector valve 5 for causing combustion at the stoichiometric air-fuel ratio in engine 1 and determined in accordance with the intake (flow) air amount Qa and the engine speed Ne (r.p.m.) of engine 1; and K is the increasing rate of the fuel injection amount relative to the fuel injection amount corresponding to the stoichiometric air-fuel ratio when the air-fuel ratio is enriched, using % as unit. The fuel injection amount corresponding value F0 determined by the above Eq. (4) corresponds to the amount of fuel injected from fuel injector valve 5 for the purpose of enriching or decreasing the air-fuel ratio over the stoichiometric level. Accordingly, the accumulated value F1 determined by Eq. (3) before the downstream-side air-fuel ratio sensor 11 makes such a judgment that the air-fuel ratio is rich at step 24 discussed after corresponds to the amount of the reducing materials passing through the catalyst for the duration in which the enrichment of the air-fuel ratio is made, and is equivalent to an oxygen amount which is obtained by subtracting the amount of oxygen remaining in the catalyst at the time at which downstream-side air-fuel ratio sensor 11 makes such a judgment that the air-fuel ratio is rich, from the amount of oxygen stored in the catalyst.

Subsequently, at step S23, F2 is calculated according to the following equation:

$$F2 = F1 \times C2 \quad (5)$$

where F2 is the total amount of oxygen released after downstream-side air-fuel ratio sensor 11 makes such a judgment that the air-fuel ratio is rich, i.e., an estimated value of the amount of oxygen remaining in the catalyst at the time when downstream-side air-fuel ratio sensor 11 makes such a judgment that the air-fuel ratio is rich; and C2 is a rate relative to F1.

At step S24, judgment is made by downstream-side air-fuel ratio sensor 11 as to whether the air-fuel ratio at the outlet of the catalyst has been inverted from the lean-side to the rich-side or not. When the result of the judgment is such that the air-fuel ratio is inverted, the flow goes to step S25.

At step S25, it is assumed that oxygen in the above-mentioned remaining oxygen amount F2 is reduced by the reducing materials in the fuel injection amount corresponding value F0 (or the amount of the reducing materials passing through the catalyst) for the enrichment so that the oxygen gradually decreases. On the above assumption, calculation is made according to the following equation:

$$F2 = F2 - F0 \quad (6)$$

At step S26, judgment is made as to whether the above-mentioned remaining oxygen amount F2 is 0 or not, i.e., whether oxygen in the catalyst has been completely released or not. When the result of the judgment is such that the oxygen in the catalyst has been completely released, the enrichment of the air-fuel ratio is judged to be unnecessary, and therefore the flow goes to step S27 at which the enrichment is terminated.

With the control of the third embodiment, the amount of oxygen remaining in the catalyst is estimated at a high accuracy at the time when the air-fuel ratio at the outlet of the catalyst is judged to be rich, and therefore the enrichment continuation duration (or the duration in which the enrichment is continued) is set corresponding to the estimated oxygen remaining amount without excess and deficiency, thereby lowering emission of NOx, CO and HC with a good balance.

Figure 6:
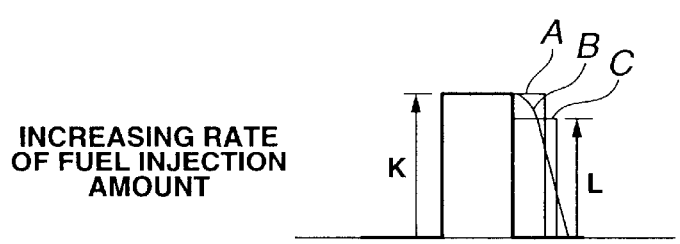
FIG. 6 is a graphical representation showing setting of an increasing rate of a fuel injection amount in a fourth embodiment of the air-fuel ratio control system according to the present invention.
Figure 7:
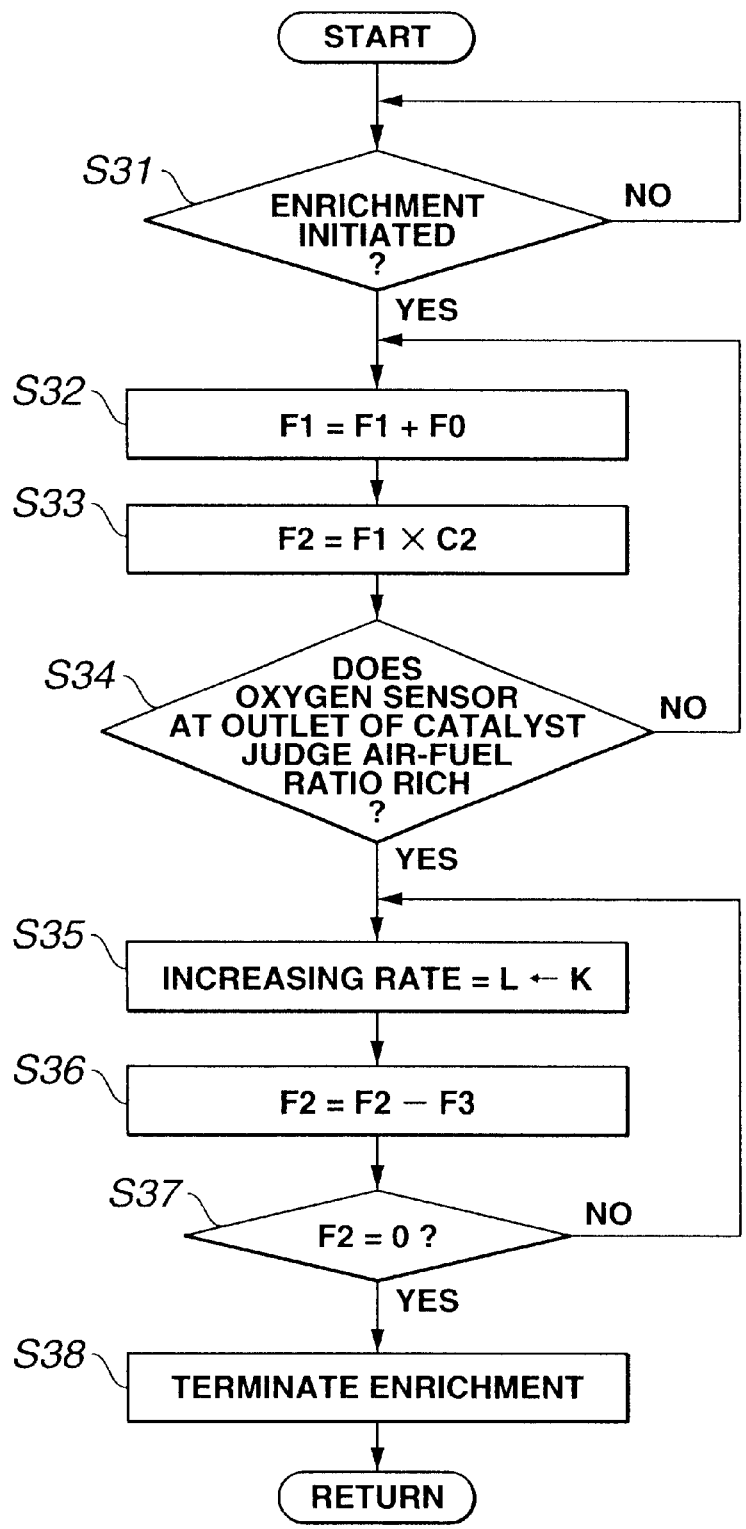
FIG. 7 is a flowchart of a control of the fourth embodiment of the air-fuel ratio control system according to the present invention.

FIGS. 6 and 7 illustrate a control of a fourth embodiment of the air-fuel ratio control system according to the present invention, similar to the first embodiment air-fuel ratio control system. FIG. 6 shows a manner for providing the increasing rate of the fuel injection amount in order to accomplish the enrichment of the air-fuel ratio of exhaust gas in this embodiment. It will be understood that, in the first and third embodiments, the same increasing rate K is used both in the enrichment duration (or the duration in which the enrichment of the air-fuel ratio is made) formed before the judgment of being rich is made and in the enrichment continuation duration formed after the judgment of being rich is made, thereby accomplishing the enrichment manner represented by a rectangular shape indicted by a line A in FIG. 6. However, in this embodiment, after the judgment is made such that the air-fuel ratio at the outlet of the catalyst becomes rich, the releasing rate of oxygen from the catalyst is lowered, so that the increasing rate is required to take such a characteristics to gradually decrease as indicated by a line B. In view of this, in the second embodiment, the increasing rate of the fuel injection amount is lowered in the manner of forming the triangular shape. In case that the termination timing of the enrichment continuation duration is determined by the accumulated value of the fuel injection amount like in the third embodiment, the basic fuel injection amounts at different times are not constant and different in accordance with engine operating conditions, and therefore it is impossible to simply change the manner of decreasing the increasing rate of the fuel injection amount into that of forming the triangular shape.

In the fourth embodiment, as indicated by a line C in FIG. 6, the increasing rate of the fuel injection amount in the enrichment continuation duration in the third embodiment is lowered relative to the increasing rate K used in the enrichment duration formed before the judgment of being rich is made, and the enrichment is continued at the lowered increasing rate.

The control of this embodiment will be explained with reference to a flowchart of FIG. 7. The control is similar to that of the third embodiment and therefore explanation will be made on steps different from those of the control of the third embodiment. It will be understood that steps S31 to S34, S37 and S38 correspond respectively to steps S21 to S24, S26 and S27 in the flowchart of FIG. 5.

After the air-fuel ratio at the outlet of the catalyst is judged to be rich at step S34, the increasing rate of the fuel injection amount for the purpose of the enrichment of the air-fuel ratio is lowered to an increasing rate L (%) from the increasing rate K (%) used before the air-fuel ratio is judged to be rich, at step S35.

At step S36, the remaining oxygen amount F2 is calculated according to the following equation:

$$F2=F2-F3 \quad (7)$$

F3 to be used in Eq. (7) is calculated corresponding to the lowered increasing rate L, according to the following equation:

$$F3=Tp \times L/100 \times Ne/60/100(ms/10\ ms) \quad (8)$$

Figure 8:
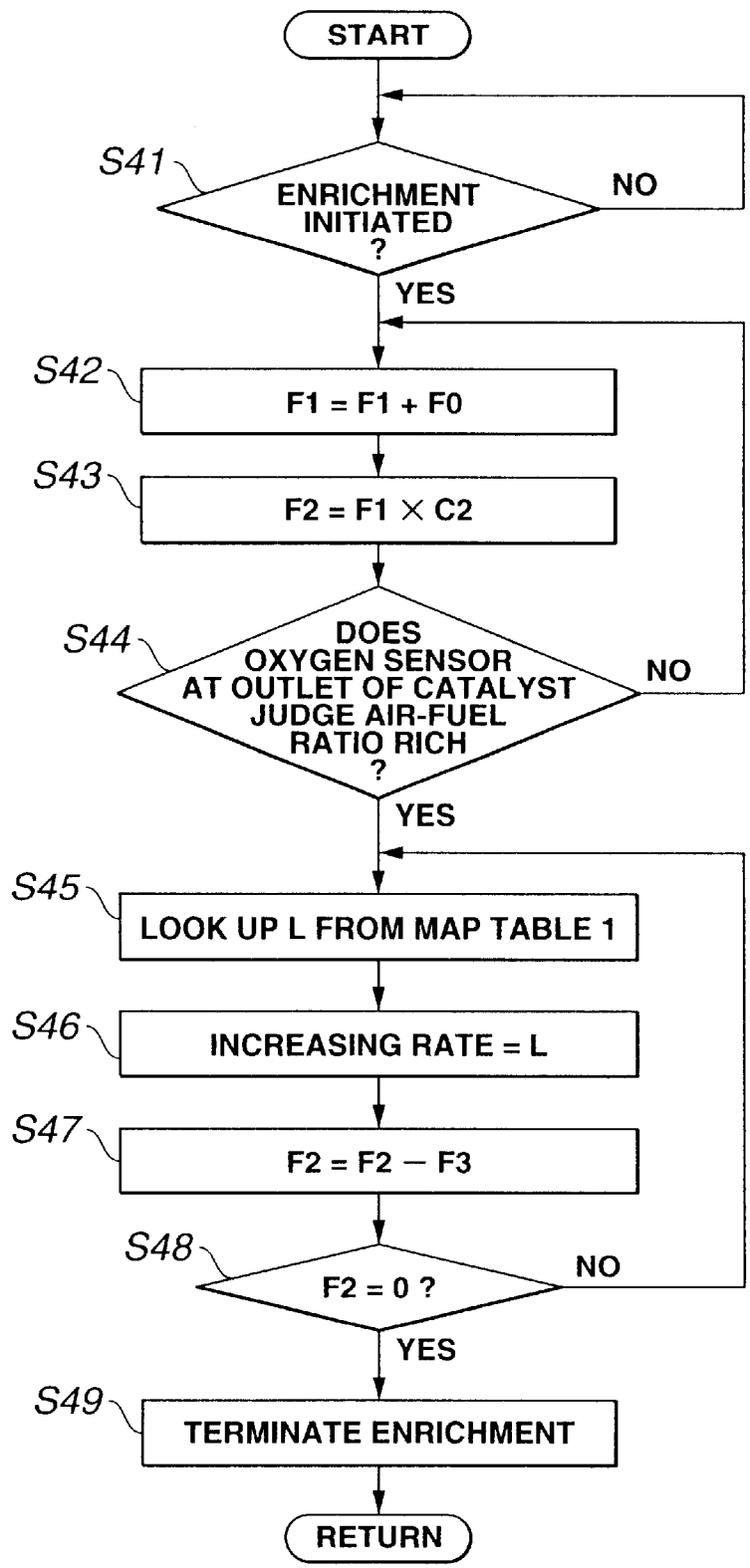
FIG. 8 is a flowchart of a control of a fifth embodiment of the air-fuel ratio control system according to the present invention.

FIGS. 8 to 10 illustrate a control of a fifth embodiment of the air-fuel ratio control system according to the present invention, similar to the first embodiment air-fuel ratio control system. This embodiment is intended to the increasing rate of the fuel injection amount is stepwise decreased with lapse of time. The control manner of this embodiment shown in a flowchart of FIG. 8 and similar to that of the fourth embodiment so that steps S41 to S44 and steps S47 to S49 correspond respectively to steps S31 to S34 and steps S36 to S38. Therefore, explanation of the control of this embodiment will be made on steps different from those of the control of the fourth embodiment.

After the air-fuel ratio at the outlet of the catalyst is judged to be rich at step S44, the increasing rate L of the fuel injection amount for the enrichment of the air-fuel ratio is looked up from a map table 1 (in FIG. 9) in which the increasing rate L is set in such a manner as to stepwise decrease with the remaining oxygen amount F2 which decreases with lapse of time, at step S45.

At step S46, the increasing rate of the fuel injection amount is set at the value L looked up from the map table 1. More specifically, when F2≧F2 initial value (obtained at a time when the air-fuel ratio at the outlet of the catalyst is inverted to the rich-side)×a, the increasing rate is set at a value L2 slightly smaller than the increasing rate K used before the enrichment continuation duration, in which a is a coefficient of 0<a<1. When F2 initial value×b≦F2<F2 initial value×a, the increasing rate is set at a value L2 which is smaller than the value L1, in which b is a coefficient of 0<b<a. When F2>F2 initial value×b, the increasing rate is set at a value L3 which is smaller than the value L2 as shown in FIG. 10.

With the above control of the fifth embodiment, the increasing rate L of the fuel injection amount is changed over to become further close to the actual characteristics of the oxygen releasing rate from the catalyst, and therefore emissions of NOx, CO and HC can be lowered with a good balance.

Figure 12:
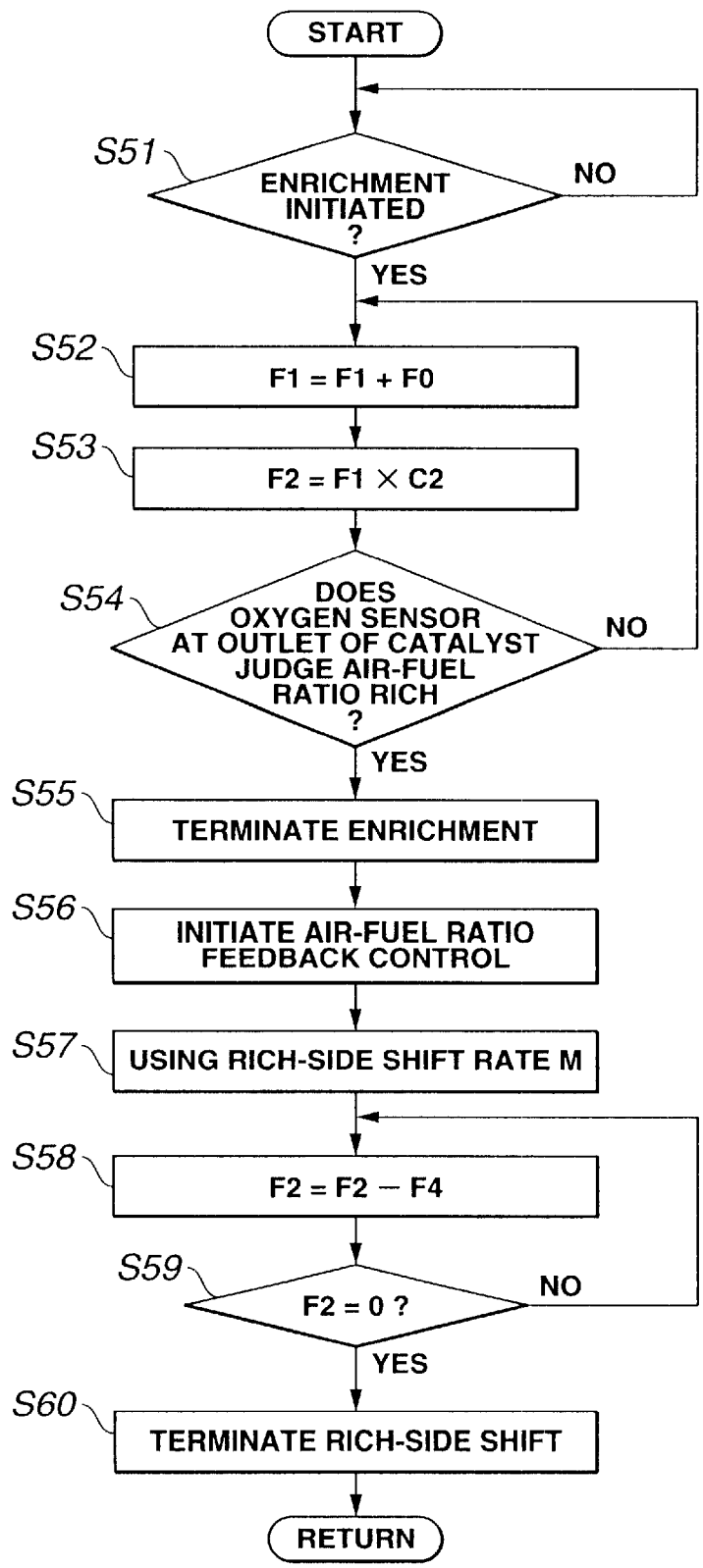
FIG. 12 is a flowchart of a control of a sixth embodiment of the air-fuel ratio control system according to the present invention.

FIGS. 11 and 12 illustrate a control of a sixth embodiment of the air-fuel ratio control system according to the present invention, similar to the first embodiment air-fuel ratio control system. This embodiment is intended to realize the enrichment of the air-fuel ratio continued after the air-fuel ratio at the outlet of the catalyst is inverted to the rich-side under a feedback control of the air-fuel ratio. FIG. 11 shows an example of the air-fuel ratio feedback control in case that an oxygen sensor is used as upstream-side air-fuel ratio sensor 8. The air-fuel ratio feedback control is to control the average air-fuel ratio at the inlet of the catalyst at a target air-fuel ratio by multiplying the fuel injection amount by the air-fuel ratio feedback correction coefficient a which is set according to the output of upstream-side air-fuel ratio sensor 8. Here, in case that the air-fuel ratio feedback correction coefficient a is set by general proportional-plus-integral control, a proportional amount PL (in a direction of increasing the fuel injection amount) set when the air-fuel ratio at the inlet of the catalyst is inverted to the lean-side is set larger than a proportional amount PR (in a direction of decreasing the fuel injection amount) set when the air-fuel ratio at the inlet of the catalyst is inverted to the rich-side. By this, the average air-fuel ratio shits to the rich-side by an air-fuel ratio amount proportional to PL/PR, the air-fuel ratio amount corresponding to a rich-side shift rate M which is determined by the following equation:

$$M=PL/PR \times C3(\%) \quad (9)$$

The average air-fuel ratio may shift to the rich-side by setting an integral amount IL (in a direction of increasing the fuel injection amount) set when the air-fuel ratio at the inlet of the catalyst is inverted to the lean-side, larger than an integral amount IR (in a direction of decreasing the fuel injection amount) set when the air-fuel ratio at the inlet of the catalyst is inverted to the rich-side. This rich-side shift manner may be used in combination with the above rich-side shift manner using the proportional amounts.

The control of this embodiment is shown in a flowchart of FIG. 12 and similar to that of the fifth embodiment so that steps S51 to S54 correspond respectively to steps S41 to S44 in the flowchart of FIG. 8. Therefore, explanation of the control of this embodiment will be made only on steps different from those of the control of the fifth embodiment.

After the air-fuel ratio at the outlet of the catalyst is judged to be rich at step S54, the enrichment (under a feed-forward control) by using the increasing rate of the fuel injection amount is terminated at step S55.

At steps S56 and S57, the air-fuel ratio feedback control including the air-fuel ratio shift to the rich-side is initiated.

At step S58, the remaining oxygen amount F2 is calculated as F2=F2−F4. F4 to be used in this calculation is calculated according to the following equation:

$$F4 = Tp \times M/100 \times Ne/60/100 (ms/10\ ms) \qquad (10)$$

At step S59, judgment is made as to whether F2=0 has been established or not. When F2=0 has been established, the air-fuel ratio feedback control including the air-fuel ratio shift to the rich-side is terminated.

In case that the wide area air-fuel ratio sensor is used as upstream-side air-fuel ratio sensor 8, the feedback control may be carried out in such a manner that a detection value of the wide area air-fuel ratio sensor becomes a level corresponding to a target rich air-fuel ratio.

By accomplishing the enrichment of the air-fuel ratio under the air-fuel ratio feedback control, a stable enrichment control can be achieved without being affected by deterioration with age.

As appreciated from the above, according to the present invention, although oxygen stored in the NOx trap catalyst remains as it is even at the time when the air-fuel ratio at the position downstream of the NOx trap catalyst is detected as being rich, the rich air-fuel ratio engine operation is continued for the certain duration after the time, so that oxygen in the NOx trap catalyst and other catalysts in the exhaust gas passageway can be sufficiently released. As a result, NOx in the NOx trap catalyst can be sufficiently released from and reduced by the NOx trap catalyst, thus totally lowering the emission levels of CO, HC and NOx with a good balance.

The entire contents of Japanese Patent Application P2001-188037 (filed Jun. 21, 2001) are incorporated herein by reference.

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

What is claimed is:

1. An air-fuel ratio control system for an internal combustion engine provided with a NOx trap catalyst disposed in an exhaust gas passageway and arranged to trap NOx in a first condition in which an air-fuel ratio of exhaust gas flowing to the NOx trap catalyst is lean and to release and reduce trapped NOx in a second condition in which the air-fuel ratio of exhaust gas flowing to the NOx trap catalyst is rich, said air-fuel ratio control system comprising:

a sensor for detecting an air-fuel ratio of exhaust gas in the exhaust gas passageway downstream of the NOx trap catalyst; and a control circuit configured to cause the engine to operate at a rich air-fuel ratio to accomplish a rich air-fuel ratio engine operation after an engine operation at a lean air-fuel ratio, set a first duration by multiplying a second duration of from a first time at which the rich air-fuel ratio engine operation is initiated to a second time at which said sensor detects that the air-fuel ratio of exhaust gas is rich, by a rate, and continue the rich air-fuel ratio engine operation for the first duration even after said sensor has detected that the air-fuel ratio of exhaust gas is rich.

2. An air-fuel control system as claimed in claim 1, wherein said control circuit is configured to gradually decrease a degree of enrichment of the air-fuel ratio for the first duration.

3. An air-fuel ratio control system as claimed in claim 1, wherein said control circuit is configured to decrease a degree of enrichment of the air-fuel ratio for the first duration relative to a degree of enrichment of the air-fuel ratio used before said sensor detects that the air-fuel ratio of exhaust gas is rich.

4. An air-fuel ratio control system as claimd in claim 1, wherein said control circuit is configured to accomplish the rich air-fuel ratio engine operation for the first duration by enriching an average air-fuel ratio in an air-fuel ratio feedback control.

5. An air-fuel ratio control system as claimed in claim 1, wherein said control circuit is configured to cause the engine to operate at a stoichiometric air-fuel ratio after termination of the rich air-fuel ratio engine operation for the first duration.

6. An air-fuel ratio control system for an internal combustion engine provided with a NOx trap catalyst disposed in an exhaust gas passageway and arranged to trap NOx in a first condition in which an air-fuel ratio of exhaust gas flowing to the NOx trap catalyst is lean and to release and reduce trapped NOx in a second condition in which the air-fuel ratio of exhaust gas flowing to the NOx trap catalyst is rich, said air-fuel ratio control system comprising:

a sensor for detecting an air-fuel ratio of exhaust gas in the exhaust gas passageway downstream of the NOx trap catalyst; and a control circuit configured to cause the engine to operate at a rich air-fuel ratio to accomplish a rich air-fuel ratio engine operation after an engine operation at a lean air-fuel ratio, set a first duration in accordance with an accumulated value of a first value corresponding to a fuel injection amount for enriching the air-fuel ratio over a stoichiometric air-fuel ratio, for a second duration of from a first time at which the rich air-fuel ratio engine operation is initiated to a second time at which said sensor detects that the air-fuel ratio of exhaust gas is rich, and continue the rich air-fuel ratio engine operation for the first duration even after said sensor has detected that the air-fuel ratio of exhaust gas is rich.

7. An air-fuel ratio control system as claimed in claim 6, wherein said control circuit is configured to subtract the first value for the first duration from a second value obtained by multiplying the accumulated value by a rate so as to obtain a subtracted value, and terminate the rich air-fuel ratio engine operation at a time when the subtracted value becomes lower than a threshold value.

8. An air-fuel ratio control system as claimd in claim 7, wherein said control circuit is configured to decrease the degree of the enrichment of the air-fuel ratio as the subtracted value decreases.

9. An air-fuel ratio control system as claimed in claim 8, wherein said control circuit is configured to decrease a degree of enrichment of the air-fuel ratio for the first duration relative to a degree of enrichment of the air-fuel ratio used before said sensor detects that the air-fuel ratio of exhaust gas is rich.

10. An air fuel ratio control system as claimed in claim 8, wherein said control circuit is configured to accomplish the rich air-fuel ratio engine operation for the first duration by enriching an average air-fuel ratio in an air-fuel ratio feedback control.

11. An air-fuel ratio control system as claimed in claim 8, wherein said control circuit is configured to cause the engine to operate at a stoichiometric air-fuel ratio after termination of the rich air-fuel ratio engine operation for the first duration.

12. An air-fuel ratio control system as claimed in claim 7, wherein said control circuit is configured to decrease a degree of enrichment of the air-fuel ratio for the first duration relative to a degree of enrichment of the air-fuel ratio used before said sensor detects that the air-fuel ratio of exhaust gas is rich.

13. An air-fuel ratio control system as claimed in claim 7, wherein said control circuit is configured to accomplish the rich air-fuel ratio engine operation for the first duration by enriching an average air-fuel ratio in an air-fuel ratio feedback control.

14. An air-fuel ratio control system as claimed in claim 7, wherein said control circuit is configured to cause the engine to operate at a stoichiometric air-fuel ratio after termination of the rich air-fuel ratio engine operation for the first duration.

15. An air-fuel ratio control system as claimed in claim 6, wherein said control circuit is configured to decrease a degree of enrichment of the air-fuel ratio for the first duration relative to a degree of enrichment of the air-fuel ratio used before said sensor detects that the air-fuel ratio of exhaust gas is rich.

16. An air-fuel ratio control system as claimed in claim 6, wherein said control circuit is configured to accomplish the rich air-fuel ratio engine operation for the first duration by enriching an average air-fuel ratio in an air-fuel ratio feedback control.

17. An air-fuel ratio control system as claimed in claim 6, wherein said control circuit is configured to cause the engine to operate at a stoichiometric air-fuel ratio after termination of the rich air-fuel ratio engine operation for the first duration.

* * * * *